(12) United States Patent  (10) Patent No.: US 8,891,840 B2
Sui et al.  (45) Date of Patent: Nov. 18, 2014

(54) DYNAMIC STEERED SPATIAL COMPOUNDING IN ULTRASOUND IMAGING

(75) Inventors: Lei Sui, Newcastle, WA (US); Rushabh Modi, Issaquah, WA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 307 days.

(21) Appl. No.: 13/372,229

(22) Filed: Feb. 13, 2012

(65) Prior Publication Data

US 2013/0208965 A1  Aug. 15, 2013

(51) Int. Cl.
*G06T 7/00* (2006.01)
*G06T 11/00* (2006.01)
*A61B 8/00* (2006.01)

(52) U.S. Cl.
USPC .......................... 382/128; 382/284; 600/437

(58) Field of Classification Search
None
See application file for complete search history.

(56) References Cited

U.S. PATENT DOCUMENTS

| | | | |
|---|---|---|---|
| 5,148,810 A | 9/1992 | Maslak et al. | |
| 5,235,986 A | 8/1993 | Maslak et al. | |
| 5,261,408 A | 11/1993 | Maslak et al. | |
| 5,566,674 A | 10/1996 | Weng | |
| 5,575,286 A | 11/1996 | Weng et al. | |
| 5,782,766 A | 7/1998 | Weng et al. | |
| 6,014,473 A | 1/2000 | Hossack et al. | |
| 6,083,168 A * | 7/2000 | Hossack et al. | 600/443 |
| 6,117,081 A | 9/2000 | Jago et al. | |
| 6,126,598 A | 10/2000 | Entrekin et al. | |
| 6,126,599 A | 10/2000 | Jago et al. | |
| 6,135,956 A | 10/2000 | Schmiesing et al. | |
| 6,547,732 B2 | 4/2003 | Jago | |
| 6,858,010 B2 | 2/2005 | Guracar et al. | |
| 6,872,181 B2 | 3/2005 | Tirumalai et al. | |
| 7,780,601 B2 | 8/2010 | Guracar et al. | |
| 2002/0167533 A1 | 11/2002 | Tirumalai et al. | |
| 2008/0306382 A1 * | 12/2008 | Guracar et al. | 600/437 |
| 2009/0203997 A1 | 8/2009 | Ustuner | |

* cited by examiner

*Primary Examiner* — Jon Chang

(57) ABSTRACT

Dynamic steered spatial compounding is provided in ultrasound imaging. The compounding adjusts for variance. The compounding dynamically reacts to variance due to motion and/or view direction. For each location, the weights are set based on the motion or signal variance for the respective location. The weighting used for compounding or the results of the compounding adapt to maintain or increase signal fidelity.

21 Claims, 3 Drawing Sheets

US 8,891,840 B2

DYNAMIC STEERED SPATIAL COMPOUNDING IN ULTRASOUND IMAGING

BACKGROUND

The present invention relates to spatial compounding. Steered spatial compounding is used in clinical environments. One component frame of data is acquired by scanning along scan lines at one angle or pattern relative to a transducer. A second component frame of data is acquired by scanning along scan lines at a different angle or pattern. The transducer is held at substantially one position on the patient for acquiring the sequential component frames of data. Each of the frames of data represents an overlapping region of a patient. The frames of data are compounded together and displayed as an image.

Steered spatial compounding in ultrasound reduces speckle noise. Compounding component frames of data associated with different scan angles may reduce speckle and produce a more continuous border in specular targets, such as muscle layers. However, the improvement of signal-to-noise ratio may be limited by averaging signals from different steered angles with motion or uneven signal strength. In steered spatial compounding, the signal intensity for the same target location may be different among different views or steering angles. Simple averaging of those signals may reduce the signal-to-noise ratio. The problem is worse when motion occurs between acquisitions of the signals for the different views. Motion blur and lack of details due to averaging may be undesired.

BRIEF SUMMARY

By way of introduction, the preferred embodiments described below include methods, computer readable media, instructions, and systems for dynamic steered spatial compounding in ultrasound imaging. The compounding adjusts for variance. The compounding dynamically reacts to variance due to motion, tissue structure, and/or view direction. For each location, the weights are set based on the motion or signal variance for the respective location. The weighting used for compounding or the results of the compounding adapt to maintain or increase signal fidelity.

In a first aspect, a method is provided for dynamic steered spatial compounding in ultrasound imaging. Steered component frames of data are acquired. The steered component frames of data represent an overlap region of a patient, and are responsive to different imaging angles. It is determined when variance between the steered component frames of data is associated with motion and when the variance is associated with signal. Weights are set as a function of the motion when the variance between the steered component frames of data is associated with the motion. The weights are set as a function of type of tissue when the variance is associated with signal. The steered component frames of data are compounded together as a function of the weights. An image of the overlap region is generated from a result of the compounding.

In a second aspect, a non-transitory computer readable storage medium has stored therein data representing instructions executable by a programmed processor for dynamic steered spatial compounding in ultrasound imaging. The storage medium include instructions for estimating a type of object for each of a plurality of locations, determining, for each location, contribution of views of the locations for different directions as a function of the type of objects at the locations, combining, for each location, the views as a function of the contribution for the location, and generating an image from the combined views.

In a third aspect, a system is provided for dynamic steered spatial compounding in ultrasound imaging. A beamformer is operable to acquire a sequence of steered frames of data responsive to different steering angles from a substantially same transducer position. A processor is configured to detect motion, set a contribution of the steered frames of data as a function of a frame rate and a threshold, and generate a compound image from the steered frames of data as a function of the contribution. A display is operable to display the compound image.

In a fourth aspect, a non-transitory computer readable storage medium has stored therein data representing instructions executable by a programmed processor for dynamic steered spatial compounding in ultrasound imaging. The storage medium includes instructions for acquiring steered component frames of data, the steered component frames of data representing an overlap region of a patient, and being responsive to different steering angles, averaging the steered component frames of data for each location in the overlap region, adjusting an average resulting from the averaging, the adjusting being a function of variation due to motion or between the steered component frames of data, and generating an image of the overlap region from a result of the averaging and adjusting.

Further aspects and advantages of the invention are discussed below in conjunction with the preferred embodiments. The present invention is defined by the following claims, and nothing in this section should be taken as a limitation on those claims.

BRIEF DESCRIPTION OF THE DRAWINGS

The components and the figures are not necessarily to scale, emphasis instead being placed upon illustrating the principles of the embodiments. Moreover, in the figures, like reference numerals designate corresponding parts throughout the different views.

DETAILED DESCRIPTION

Compounding component frames or views associated with different scans reduces high spatial frequency information, such as speckle. However, the compounding may result in decreasing signal-to-noise ratio where there is greater variance in the values between the different component frames. To compensate this issue, the signal variation and motion between views are identified and accounted for in compounding.

For signal variation between component frames, the difference among beam directions is determined, and the difference is compensated for in the averaging processing. When motion is not detected, different weights are applied to views based on the object at the location to achieve better or predetermined imaging effect for each signal region and structure. The dynamic compounding estimates tissue region or its structure and the signal difference from different angles. The best signal(s) are dynamically picked from a set of views at each pixel or acoustic sample location to mitigate the averaging effect. Better signal fidelity may be achieved for each viewing angle resulting in improvement of contrast resolution and overall image quality.

For variance due to motion, a subset of the component frames to be compounded is emphasized. When motion is detected, the set of latest frames for compounding is adjusted based on the human eye's sensitivity of motion and the acquiring time between frames (frame rate). The subset is based on the frame rate and the human sensitivity of motion in time, such as more greatly weighting frames within a memory persistence or noticeability of a user and reducing the weighting for older frames.

The dynamic adapting of the compounding for motion and/or view variation does not use motion registration. Attempting to align frames acquired at different times and angles to account for motion may be unreliable in regular clinical scanning. Instead, the weights from older frames are dynamically reduced, allowing compounding without re-registration.

Other compounding processes or dynamic adaptations may be used. For example, the processes to preserve clinical marker information disclosed in U.S. Pat. Nos. 6,858,010 and/or 7,780,601, the disclosure of which is incorporated herein by reference, may be used.

Figure 1:
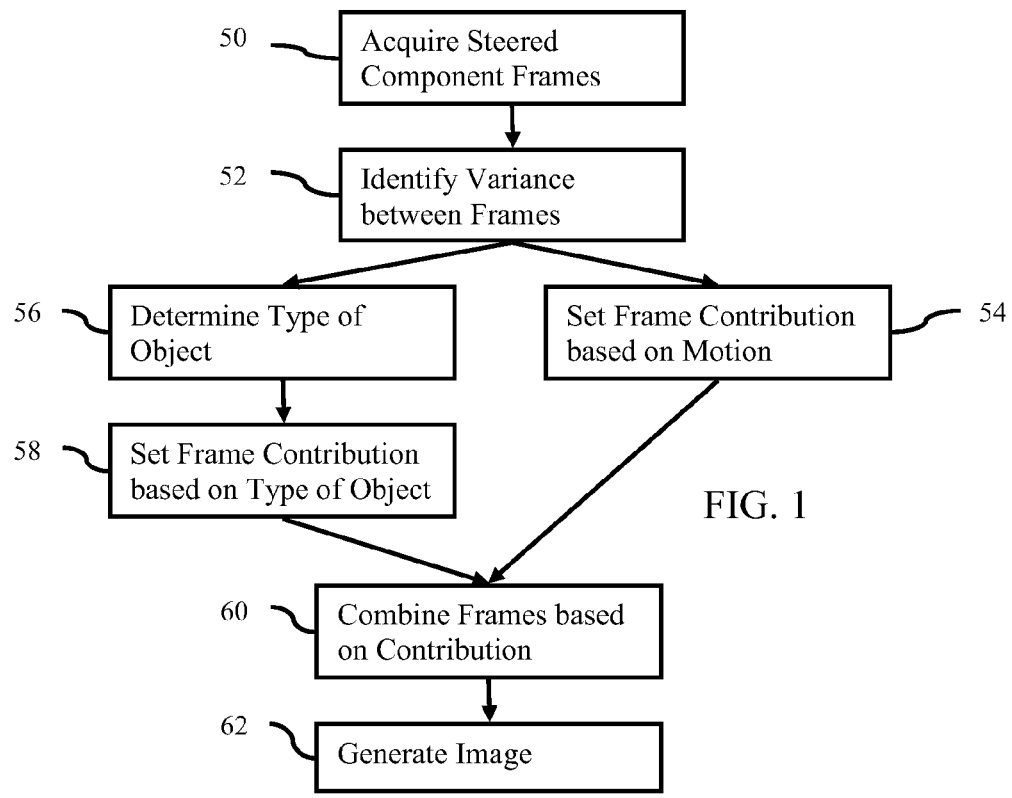
FIG. 1 is a flow chart diagram of one embodiment of a method for dynamic steered spatial compounding in ultrasound imaging.

FIG. 1 shows one embodiment of a method for dynamic steered spatial compounding in ultrasound imaging. The spatial compounding adapts to variance between the different views or component frames of data regardless of the steering angles. The particular steering angles are not used as a criterion for adaptation, but may be.

The method is performed in the order shown or a different order. For example, act 56 is performed before act 52. Additional, different, or fewer acts may be provided. For example, act 54 is performed without acts 56 and 58, or vice versa.

Figure 2:
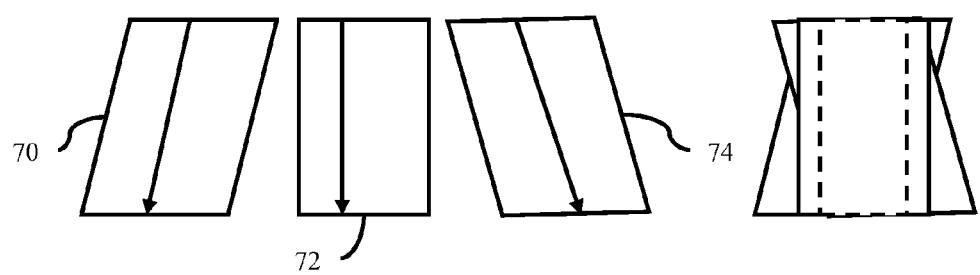
FIG. 2 is an example representation of three steered component frames of data.

In act 50, steered component frames of data are acquired. The component frames of data are steered electrically, mechanically, or by spatial positioning of the transducer. Each or multiple of the steered component frames of data are acquired at different steering angles. For example, FIG. 2 shows three electronically steered frames 70, 72, and 74 of data acquired in response to three different steering angles (see the ray line for each frame 70, 72, 74) or scan patterns with one or more scan lines at a different steering angle. Each of the component frames of data span substantially a same spatial extent of a region of a target, such by maintaining the transducer in a same position with or without intentional wobbling, positioning of the transducer(s). A majority, above 90% or almost the entire scanned region for each of the component frames of data overlaps with the scanned regions of the other component frames (see the dashed box).

One of the component frames of data is responsive to at least one different scan line angle relative to at least one location in the scanned region than another of the component frames of data. For each location, the intersecting scan lines from the different component frames are at different angles, at least for two of the component frames.

In alternative embodiments, the transducer is moved during acquisition of sequential frames of data, such as associated with extended field of view imaging. Where non-linear scan patterns are used, where the transducer is rotated as well as translated, or where multiple transducers are spatially positioned to acquire the target images, different component frames of data may represent overlapping regions from different angles. By combining the data for the overlapping regions, steered compounding is provided.

Two or more frames of data are acquired representing the same or different regions. For example, the scan lines of three component frames of data are each associated with a different region or scan geometry. The scan lines may be acquired in any format, such as linear, curved linear, sector curved sector, Vector®, curved Vector® and combinations thereof. For example, scan lines acquired with a linear transducer are steered at three different angles (e.g., +/−10 degrees and normal) in a linear or generally rectangular or parallelogram scan format for three component frames of data, respectively. For one component frame of data, the scan lines originate at different positions on the transducer 14, but two or more scan lines may originate from a same position. Using the linear format, the scan lines are parallel and in a same direction relative to the intersections of the scan lines with the origins on the transducer 14. The majority of the scan lines of each component frame point in a same direction. As another example, different angles from the face of the transducer 14 are provided by a scanning apex position on or behind the transducer 14 for sector or Vector® formats. The scan line density along the transducer surface is either uniform or changes as a function of the scan line position. The scan line density may be different for one frame of data as compared to another frame of data, such as having different uniform densities or having differences in variation of the density. Any of various combinations of formats or variation in scan line origin or angle within a single scan or between scans resulting in spatial diversity may be used, such as described in U.S. Published Patent Application No. 2002/167533-A1, the disclosure of which is incorporated herein by reference.

Each of the component frames of data corresponds to different steering angles. For example, a majority of scan lines extend in a first direction, such as 10 degrees left from the transducer for one component frame of data. The majority of scan lines extend at a 10 degree right angle from the transducer for another component frame of data. The majority of the scan lines are normal to the transducer for a third component frame of data. Different steering angles other than plus or minus 10 degrees and zero may be used with 2, 3, 4 or more component frames.

In one embodiment, one component frame is associated with the maximum angle of steering provided by the transducer without undesired grating lobe effects. A second component frame is associated with the same angle but in a different direction relative to the transducer. Additional component frames, if any, are associated with lesser angles of steering. In alternative embodiments, the greatest steering angle is less than the maximum possible with the transducer. As another example, the position of the scanning apex of the scan lines is different, such as spaced laterally, between two component frames of data, resulting in different steering angles. As yet another example, the scan lines are steered the same for each component frame of data, but the transducer is wobbled about an axis, such as the azimuth axis.

In addition to or as an alternative to steering, spatial diversity between component frames of data is provided by altering the aperture, apodization or other scan characteristic resulting in different spatial response. Any of various types of compounding may be used, such as: temporal compounding (i.e. each component frame acquired at a different time) or simultaneous acquisition of different component frames; frequency compounding (i.e. each component frame acquired in response to a different frequency characteristic) or component frames acquired with a same frequency; spatial compounding or component frames of data acquired with a same spatial response; steered spatial compounding or component frames of data acquired without steering; and combinations thereof.

In one embodiment, the same or substantially same scan lines are used for both transmit and receive operations for any given component frame of data. In alternative embodiments, one or more of the scan lines are different for transmit than for receive operation. For example, acoustic energy is transmitted along scan lines normal to the transducer for a linear array and received along scan lines at non-normal angles. For a curved array, the energy is transmitted along scan lines in one format and received along scan lines in a different format, pattern or positions. As another example, the same scan lines are used for transmit for all or multiple of the component frames of data, but different electric steering is provided during receive of each or multiple of the component frames of data as disclosed in U.S. Pat. No. 6,508,770, the disclosure of which is incorporated herein by reference.

In alternative embodiments, any of the various scanning methods and systems disclosed in U.S. Pat. Nos. 5,148,810, 5,235,986 and 5,261,408, the disclosures of which are incorporated herein by reference, may be used. The techniques disclosed in one or more of these patents show a Vector® scanning pattern using non-overlapping scan lines for obtaining a wider field of view with a transducer. Scan formats and apparatus of one or more of the patents show the use of a common apex or vertex of the acoustic lines spaced behind the transducer 14, and the teachings therein may be used for positioning the common apex at different positions laterally relative to the transducer for obtaining component frames each associated with a different relative steering angle for the majority of scan lines. In other alternative embodiments, any of the spatial compounding techniques and associated acquisition of component frames with different steering angles disclosed in U.S. Pat. Nos. 6,117,081, 6,126,598, 6,126,599, 6,135,956 and 6,872,181, the disclosures of which are incorporated herein by reference, may be used.

Figure 3:
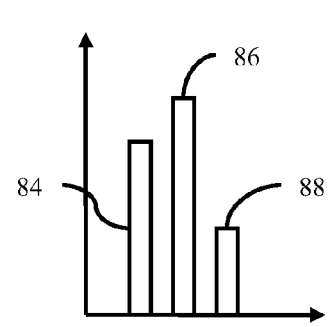
FIG. 3 is an example graphical representation of variance of signals for a location in an overlap region.

In act 52, a source of variance between the frames of data is determined. For a given location, the values from each of the component frames may be the same or different. FIG. 3 shows the values as a bar graph for the three component frames 70, 72, and 74. The values are intensity, but may be energy or another detected parameter for the component frames.

The variance is due to motion or are signal differences (e.g., due to a difference in scanning from the different views). The frames 70, 72, 74 are acquired sequentially by one transducer or simultaneously by multiple transducers. Where the transducer and/or patient moves during or between acquisitions, the locations represented by one frame may be offset from locations represented by another frame. This offset may not be known. Even where estimating and accounting for the motion, the motion may cause variance in the values supposedly representing a same location in each of the frames. Motion causes variation between component frames.

Another source of variance is the difference in scanning. By scanning from different directions, the values for the same location may be different. Shadowing existing from one direction may not occur when scanning from another direction. The differences in scanning may result in different speckle. The speckle varies over time and/or due to different look direction. Since the speckle may not line up at the pixel or sampling resolution, signal variance results. This noise or other artifacts may result in the variance.

The source of variance is determined from the component frames of data. Variance may be assumed whether or not there is any variance. In general, all of the locations represented by a given frame of data are assumed to have the same source of variance. Where the source is motion, the variance is the similar or predictable based on location. Where the source is other than motion, the variance may be different for different locations. Other sources of variance than motion or signal variance may exist and be distinguished.

The variance is calculated for one or more locations of the overlap region. For example, the variance is calculated for all or a spaced, sparse sampling of the locations. The source of variance is determined for each of the locations. The source causing variance in a majority of the locations is selected as the source for a given combination. This selection may be performed even where the combination for some locations is not adapted to the variation, such as where the signals for the location have a lesser variance.

In act 52, the source of variance is identified. The source may be identified by an amount of variance, pattern of variance, or combinations thereof. Variance may be calculated as a mathematical variance, standard deviation, difference between maximum and minimum, outlier detection or other indication of variation.

The variance is between the steered component frames. For a given location or group of locations, the signal value or spatial combination of values may be different for different ones of the frames, such as represented by FIG. 3. The source of variance is determined from the variance.

The variance is examined to determine either that the variance is associated with motion or that the variance is associated with signal. Other sources may be included. Other inputs in addition to or as an alternative to the variance may be used to determine the source. For example, the motion of the transducer position, a scanned object, or combinations thereof is detected. Motion of the transducer position may be detected by a sensor on the transducer. For example, magnetic coils detect relative or absolute motion of the transducer. Transducer motion and/or motion of the scanned object may be detected from scanned data, such as a minimum sum of absolute differences or correlation between component frames of data. Other techniques for motion detection, such as correlation comparisons or based on an ECG signal, may be applied.

Various possibilities exist for determining the source from the variance. In one embodiment, the variance is compared to a threshold. The threshold is a preset value. For example, the threshold is about 1.5 or other value times an expected speckle variance (e.g., 5.57 dB for soft tissue). Since different types of tissue have different speckle characteristics, the threshold may be adaptive rather than preset. For example, the speckle variation within a neighborhood of spatially adjacent regions is calculated for one, some, or all of the component frames to be combined. Any size neighborhood may be used, such as 3×3, 9×9, or 4×6. Where calculated for multiple frames, the speckle variation may be averaged, a mean selected, or other process to provide a speckle variation for the combination.

The speckle variation for the location may be weighted (e.g., 3.0, 1.5, 1.2, or other value) or not. The weight may depend on the level of speckle variation. For example, 1.5 is used for soft tissue. A range of speckle variations defines the location as soft tissue. As another example, 1.2 is used for hard tissue. A different range of speckle variations defines the location as hard tissue. Other or the same weights may be used for other types of tissue or objects. Alternatively, the same weight is applied regardless of type of tissue or object.

The variance for the location is compared to the threshold. Where the variation at a location is above the threshold, the variation is likely more than mere speckle. The speckle variation is spatial. The variance for a location is temporal, but may represent speckle due to the difference in scanning direction and/or time of scans. Where the variance between the component frames is at or above an expected speckle variation for the region, the source of the variance is considered as motion. Where the variance is below the threshold, the variance is considered to be due to the signal or speckle. Variance at or equal to the threshold may be treated as motion or signal as the source.

In another embodiment, variance across multiple locations is used. The variance is calculated for each of a plurality of locations in the overlap region. The variance from the different locations is averaged, a mean selected, or otherwise combined. Alternatively, a pattern of the variance is determined. Variance in adjacent locations being similar, but different from other locations in an expected pattern (e.g., associated with rotation), may indicate motion as the source. For translation, similar levels of variance across multiple locations may indicate motion as the source. The variance is determined as associated with the motion where the variance is similar in a threshold number of the locations, where the combined variance is above a threshold, or where the variance at the different locations is in a pattern. Otherwise, the variance is determined as associated with the signal.

In another embodiment, the variance for each location is calculated from the maximum and minimum. The values for the location from each of the component frames are examined. Maximum and Minimum values are selected. The variance is calculated as a difference between the maximum and minimum values.

The distribution of the data value for the location, of typical or expected speckle, or of the values in a spatial neighborhood around the location is calculated. The difference between the maximum and minimum is compared to the distribution. The variance is weighted by itself, or is used in a function for the comparison. The variance is determined as associated with the motion where the difference is greater than a threshold based on the standard deviation. Otherwise, the variance is determined as associated with the signal.

Figure 4:
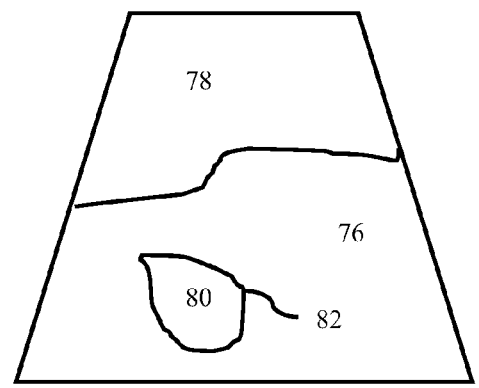
FIG. 4 is an example illustration of different objects in an overlap region.

The determination of the source may be based on the type of object at the location. Two or more different types of objects may be identified or used. FIG. 4 shows different types of objects. The region 78 represents fluid or a region of flow. The region 76 represents soft tissue. Region 80 represents hard tissue, such as associated with a lesion. Region 82 represents a tissue interface, edge, or boundary. Other types of objects may be bone or muscle. Any technique may be used to determine the type of object. For example, edge or boundary detection is used to find a tissue interface of region 82. Directional filtering, gradient processing, or other technique identifies locations associated with tissue interfaces. Speckle characteristic, such as magnitude of speckle variation, may distinguish soft tissue, hard tissue, and flow. Doppler velocity and/or energy may indicate flow or fluid region. A B-mode threshold may distinguish between fluid, bone, and tissue regions. Other techniques may be used. Combinations of techniques may be used.

The source is determined from the type of object. For example, the use of the threshold calculated from the speckle variation determines the type of tissue for the location. The neighborhood of surrounding locations is used to determine one or more speckle characteristics. The speckle characteristics indicate the type of object. By setting a threshold based on the speckle characteristic, the determination of source depends on the type of object at the location. The threshold is dynamically computed based on the speckle region. Other techniques for determining the type of object may be used.

The variance is associated with the motion where the variance is above a threshold where the threshold is based on the type of object. In alternative embodiments, the variance being below a threshold may indicate motion. Otherwise, the variance is associated with the signal. The test for source is performed for all, a sampling, or any number of locations. Where a majority or other number of locations indicates a particular source, that source is used for the entire combination.

In act 54, the relative contribution of the different frames to the combination is set based on the source of variance being motion. Where the primary source of variance is determined as motion, values from different frames are emphasized as compared to a simple average or as compared to where the primary source of variance is the signal.

The relative contribution may be set by assignment of weights, by selection of the component frames of data to be combined, or by alteration of the value resulting from the combination. In one embodiment, the weights are set. In the example of FIGS. 2 and 3, the contribution of each value of the component frames of data is varied. Rather than a straight average (e.g., weights of 33%), the weight for one or more of the values or frames is increased or decreased. For example, the second and third values are increased in weight (e.g., 50% and 35%) and the first value is decreased in weight (e.g., 15%). The increase and decrease are relative to equal weighting. Other relative weighting may be used.

The component frames to weight more or less heavily is determined based on the motion. The motion results in undesired variance. To reduce the effects of the motion, less information from a given frame is used, resulting in more information being from another frame. This reduces the variation due to motion.

The threshold for which frames to emphasize and which to deemphasize may be based on the typical user. The sensitivity of human eyes or perception to motion or change may indicate a period. For example, the ability of the user to perceive differences may be limited in a period from 0-30 or 40 ms. The last frame and other frames acquired within this period may be emphasized relative to earlier frames.

The compounding weights are dynamically computed to accommodate the motion shift. Different weighting combinations based on the number of component frames within the period (e.g., the frame rate) and the total number of component frames to be combined may be stored and selected. For example, three component frames are to be combined. Where the frame rate results in greater the 30 or 40 ms between frames, the example weights may be 75%, 20%, 5% with the most recently acquired frame emphasized more. Where the frame rate results in two frames within the period, the example weights may be 55%, 30%, 15%. Other weighting may be used. Weights of 0% or 100% may be used. In alternative embodiments, the amount of motion or variance is used as well as the frame rate to select or calculate the weights.

This emphasis is provided for the entire overlap region, regardless of an amount of variation at any given location. The same weights are used for all locations. Alternatively, the emphasis is provided for locations associated with a threshold variance and not for locations less than the threshold. The weights vary as a function of location or sub-region (group of locations). The amount of variance for different locations may be used to select or use different weights for combining at the respective locations. Some positions in the overlap region may be subjected to less motion, so the values of the frames are more equally weighted. Positions associated with more motion, may have weights more greatly emphasizing the most recently acquired frame or frames. Some locations may have other sources of variance, so the weighting also adapts to those sources.

In alternative embodiments, the frames to be emphasized are other than the most recent. For example, the frame with the least steering (e.g., scan lines normal to the array) is emphasized. The period is centered, started, or ends at the frame with the least steering. Any frames within the period may also be emphasized the same, more, or less then the primary frame (e.g., least steered frame or last acquired frame). Frames outside the period are emphasized less or deemphasized.

Other criteria in addition to the period and frame rate may be used. For example, different weighting combinations may be used for different types of objects. To avoid blurring an edge, a single frame may be more emphasized than other frames. The already emphasized frame is further emphasized to better maintain an edge. Where the object is soft tissue, more equal weighting than otherwise (e.g., 75%, 20%, 5% instead of 80%, 18%, 2%) may be used to provide speckle reduction despite the motion.

In acts 56 and 58, the relative contribution between the frames is set where the primary variance is due to signal. In alternative embodiments, act 56 is not performed. Other criteria may be used than the type of object for setting the contribution in act 58.

In act 56, the type of object is determined. The type of object may be estimated as discussed above. The type of object is estimated for each location. For example, a standard deviation is calculated from the locations surrounding each location. The type of object is assigned as a function the standard deviation for the location. Other characteristics representing an amount of speckle may be used.

In act 58, the contribution of the different frames is determined. The different frames represent different views of the same location. The location is viewed from different directions due to the different steering for the component frames. The contribution of different frames may be set by different weighting, adjustment of the combination, and/or selection of frames for combination.

The contribution is determined as a function of the type of objects at the location. Objects associated with greater speckle may have more equal contribution to more greatly reduce the speckle. Objects associated with less speckle variation (e.g., flow or hard tissue) or a desire for greater emphasis (e.g., an edge) may have less equal weights applied to maintain signal-to-noise ratio or resolution.

A threshold may be set to select different combinations of weights. For example, the variance is compared to a threshold. Variance above the threshold is associated with one combination of weights and variance below the threshold is associated with another combination of weights. The threshold distinguishes between variances associated with different types of objects and/or distinguishes between the magnitude of variance for a given type of object. The threshold may be preset or adapt based on the location or data. For example, the type of tissue is used to set the threshold. The threshold adapting may shift more weight to particular views or frames for better signal-to-noise ratio.

In one embodiment, the weights are set by selection of one or more frames (e.g., 100% or 0% weight) or by emphasis of particular frames (e.g., less than 100% weight) based on the value. For example, the maximum or minimum values are selected. The mean, median, mathematical variance, standard deviation, outlier detection, skewness, kurtosis, non-parametical statistical distribution (histogram), or other value may be selected.

In one example, the maximum value (e.g., the value 86 for the frame 72 in FIGS. 2 and 3) is selected or weighted by a 100% weight for soft tissue or an edge. The minimum value (e.g., the value 88 for frame 74 in FIGS. 2 and 3) is selected or weighted by a 100% weight for flow. The mean or other value or combinations of values may be selected for other types of objects. For example, the mean is selected for bone, hard tissue, and muscle.

The weighting may be set based on a user input preference. For acts 54 and/or 58, the user may indicate the criteria or approach used. For example, variance in signal may be due to shadowing in one view as opposed to other views. The shadowing may be detected as a type of object. A region with values for one frame different by a similar amount from values of another frame, but otherwise similar signal levels for other locations, may indicate shadowing. The user may desire to maintain shadow information or to reduce shadowing. For maintaining, the minimum may be selected or the minimum value may be relatively emphasized. For reducing shadowing, the maximum may be selected or the minimum value deemphasized.

In act 60, the frames of data are combined. The combination is a function of the relative contribution. For example, the combination is a weighted average where the weights selected in act 54 or 56 provide the relative contribution. Alternatively, the combination may be an average (e.g., equal weights), and the relative contribution is used to alter the average value. The average may be increased or decreased based on a difference from a maximum or minimum value of the values used in the combination.

The combination is for each location. The frames of data represent the same locations in at least the overlap region. Each of the component frames are compounded together for spatial locations representing the display or overlap region. In one embodiment, detected and scan-converted frames of data are compounded together. Since scan-converted information is used, the data of each of the component frames are in a same format and grid pattern or spatial location sampling. In alternative embodiments where data is compounded prior to scan conversion, interpolation, extrapolation or other processes are used to compound any data representing adjacent or similar but not identical spatial locations.

Different locations may be associated with different numbers of frames and corresponding values. For example, an image representing more than the overlap region is generated. Due to steering, fewer component frames represent locations outside of the overlap region of all of the component frames.

The same or different weights are applied for the combination of each location. For example, one frame may be emphasized for one location and a different frame emphasized for a different location. In another example, the same frame is emphasized for all locations, such as associated with a combination of frames subjected to intervening motion.

For combination, the values are averaged or a weighted average is applied. The weighted average may be implemented by selection, such as where the weight for one frame is 100% and the weight for the other frames is 0%. Any two or more frames of data are combined, such as by averaging or maximum value selection. For FIG. 2, at least three electronically steered component frames of data responsive to three different steering angles, respectively, are combined.

A single combination is made for an image. A sequence of images may be generated. New component frames are acquired in act 50. Each combination is of different component frames than another combination. The component frames may be different by using a moving window, such that a given component frame is used in a plurality of combinations. Alternatively, each component frame is acquired for one combination and not used in other combinations.

Figure 5:
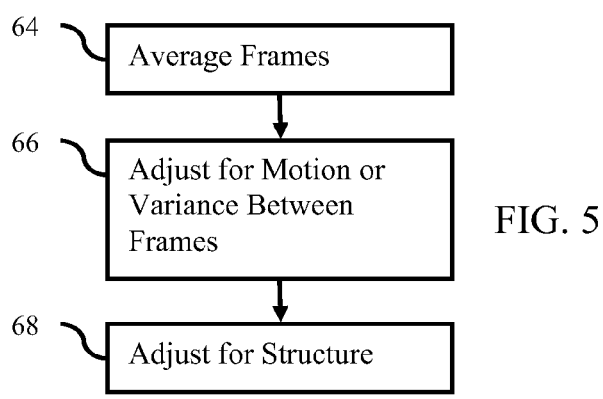
FIG. 5 is a flow chart diagram of another embodiment for dynamic steered spatial compounding in ultrasound imaging.

As an alternative or addition to using weights in the combination, the weighted average may be adjusted. FIG. 5 shows one example of this combination. In act 64, the frames are averaged. The weighted average may be a true average (i.e., equal weights) or use non-equal weights, such as associated with performing acts 54 or 58 or as associated with other weighting criteria.

In act 66, the average or result of the combination is adjusted for the motion or signal variance. The relative contribution may be used to adjust the result of the average up or down. For example, the relative contribution may indicate using a minimal value or a maximum value. The result of the average is then adjusted downward or upward. The magnitude of the adjustment may be a preset value or may vary by other factors. For example, different amounts are provided for different types of objects, magnitudes of motion, types of motion, directions of motion, speckle characteristics and/or other criteria. In one embodiment, the determined weights or the weights applied to the values of the frame are used. For example, the average is weighted by the highest or lowest weight. As another example, the average may be averaged with the weighted average. In yet another example, the weights or weighted average is used with a function or look-up table to determine a value added to or subtracted from the average.

The average for each location is adjusted by the same or different amount. The variation being due to motion or the signal indicates a desire for an adjustment. For motion, the same adjustment may be applied to all of the locations. Alternatively, different adjustments are applied for different locations, such as where rotation provides different amounts of motion. For signal, the adjustment may vary by location. The adjustment adapts based on the type of object or other criteria for each location. No or different adjustments may be provided for different locations.

In act 68, the average or adjusted average is adjusted based on other criteria. For example, U.S. Pat. No. 7,780,601, the disclosure of which is incorporated herein by reference, uses marker or structure considerations for compounding. The weighting or contribution from a marker frame may be used to adjust the average. The marker frame may be averaged with the average or used to determine an amount of adjustment by location. Any markers or other desired structure to be maintained in the combination are identified and used to increase the value of the average for this location.

The spatially compounded frame of data is corrected with clinical marker information. Portions of the compound frame of data are highlighted or altered based on detected clinical markers. The portions may be for the same or different locations for which an adjustment is performed due to variance. For example, the compound frame of data (i.e., average) is combined with a marker frame of data. Any combination may be used, such as averaging or weighted averaging with an infinite or a finite impulse response.

In one embodiment, the combined frame is a function of a weight. The low-pass filtered data for a marker is multiplied by the weight. The weighted data is added to the compound frame of data. This embodiment is represented by:

$$I_{average}^{corrected} = I_{average} + \alpha \cdot LPF\_2D\{I_0 - I_{average}\}$$

where $\alpha$ is the weight and $LPF\_2D\{I_0 - I_{average}\}$ is the low pass filtered marker frame of data formed from the difference of the compound frame of data and the straight ahead component frame of data. $I_0$ may be a zero steered image or a reconstructed image from a series of component images. The weight may be different for different situations and for different pixel locations for each situation. For example, the weight is transducer specific, application specific, or transducer and application specific. In one embodiment, the weight is set to 0.5 for breast applications and 0.75 for vascular applications. Similar combination may be used for the adjustment of act 66.

Act 66 may be performed without act 68. Alternatively, both acts are used together. For example, the tissue structure is detected and enhanced with maximum signals from different views as disclosed in U.S. Pat. No. 7,780,601 and as disclosed herein. This may be expressed as: f=a+b+c where f is the outcome, a is the averaging operation (e.g., equal or non-equal weights for each location), b is the adaptive compounding based on tissue structure (e.g., marker frame or combination with marker frame from U.S. Pat. No. 7,780,601), and c is the adaptive compounding based on view variance (signal) and/or motion variation. b and c are adjustments to be added or subtracted from the average. The adjustments may be looked-up or calculated from the weights, marker information, or combination results. Alternatively, a, b, and c are averaged.

Referring again to FIG. 1, an image is generated in act 62. The compounded frame of values representing each of the locations is used to determine pixel or image values. The image is of the overlap region, but may include other locations. The image is a steered spatial compounded image generated from combining views. The compound frame is output from the weighted averaging or the averaging and adjustments. The image represents the patient, such as showing different tissue and other structures.

The signal-to-noise ratio for the image and/or for locations represented by the image may be better than if the component frames were averaged. By accounting for signal and/or motion variance, the resulting image may provide useful information not otherwise available or more difficult to identify.

Figure 6:
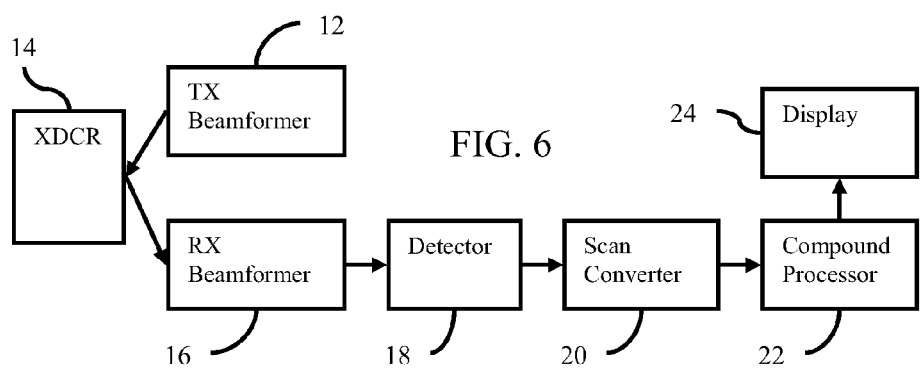
FIG. 6 is a block diagram representing one embodiment of a system for dynamic steered spatial compounding in ultrasound imaging.

FIG. 6 shows a system 10 for dynamic steered spatial compounding in ultrasound imaging. The system 10 is a medical diagnostic ultrasound system. In alternative embodiments, all or part of the system 10 is a workstation or computer for processing or displaying medical images.

The system 10 includes a transmit beamformer 12, a transducer 14, a receive beamformer 16, a detector 18, a scan converter 20, a compound processor 22, and a display 24. Different, fewer or additional components may be provided. For example, an offline workstation implements the compound processor 22 and display 24 without the additional ultrasound acquisition components.

The transducer 14 comprises an one- or multi-dimensional array of piezoelectric, ceramic, or microelectromechanical elements. In one embodiment, the transducer 14 is a one-dimensional array of elements for use as Vector®, linear, sector, curved linear, or other scan format now known or later developed. The array of elements has a wavelength, half wavelength, or other sampling frequency. A half-wavelength sampling of elements allows for greater steering angles, providing more spatial diversity for speckle reduction by compounding. The transducer 14 is adapted for use external to or use within the patient, such as a handheld probe, a catheter probe, or an endocavity probe. Multiple spatially distributed transducers or even scanning systems may be employed.

The transmit and receive beamformers 12, 16 operate as a beamformer. As used herein, "beamformer" includes either one or both of transmit and receive beamformers 12, 16. The beamformer is operable to acquire electronically or mechanically steered component frames of data responsive to different steering angles from a substantially same transducer position. The same scan pattern with different steering angles or different scan patterns resulting in different steering angles are used. Between two different scans, one or more scan lines may extend at a same angle from a same origin, but other scan lines are steered at different angles to provide component images responsive to different steering angles. For a given origin, at least one scan line may be at a different angle between the scans for two component frames of data.

The component frames of data represent different overlapping regions or a same region of the patient. The transducer 14 is substantially held in place for acquiring the component frames of data. "Substantially" is used to account for unintentional movement of the person holding the array, breathing or other motion caused by the patient, and any other incidental movement associated with using a probe not mounted in a fixed position relative to a patient fixed in place.

The transmit beamformer 12 is one or more waveform generators for generating a plurality of waveforms to be applied to the various elements of the transducer 14. By applying relative delays and apodizations to each of the waveforms during a transmit event, a scan line direction and origin from the face of the transducer 14 is controlled. The delays are applied by timing generation of the waveforms or by separate delay components. The apodization is provided by controlling the amplitude of the generated waveforms or by separate amplifiers. To scan a region of a patient, acoustic energy is transmitted sequentially along each of a plurality of scan lines. In alternative embodiments, acoustic energy is transmitted along two or more scan lines simultaneously or along a plane or volume during a single transmit event.

The receive beamformer 16 comprises delays and amplifiers for each of the elements in the receive aperture. The receive signals from the elements are relatively delayed and apodized to provide scan line focusing similar to the transmit beamformer 12, but may be focused along scan lines different than the respective transmit scan line. The delayed and apodized signals are summed with a digital or analog adder to generate samples or signals representing spatial locations along the scan line. Using dynamic focusing, the delays and apodizations applied during a given receive event or for a single scan line are changed as a function of time. Signals representing a single scan line are obtained in one receive event, but signals for two or more scan lines may be obtained in a single receive event. A component frame of data is acquired by scanning over a complete pattern with the beamformer. In alternative embodiments, a Fourier transform or other processing is used to form a component frame of data by receiving in response to a single transmit.

The detector 18 comprises a B-mode detector, Doppler detector or other detector. The detector 18 detects intensity, velocity, energy, variance or other characteristic of the signals for each spatial location in the component frame of data.

The scan converter 20 comprises a processor, filter, application specific integrated circuit or other analog or digital device for formatting the detected data from a scan line format to a display or Cartesian coordinate format. The scan converter 20 outputs each component frame of data in a display format. The component frames may include values for locations representing regions outside of the display region. In one embodiment, each component frame has the same number of pixels and an associated image geometry corresponding to the display or overlap region as described in U.S. Pat. No. 6,790,181, the disclosure of which is incorporated herein by reference.

The compound processor 22 comprises one or more memories, processors, control processors, digital signal processors, application specific integrated circuits, multiplexers, multipliers, adders, lookup tables and combinations thereof. In one embodiment, the compound processor 22 comprises a personal computer, motherboard, separate circuit board or other processor added to an ultrasound system for image processing using transfers of data to and from the ultrasound image generation pipeline or processing path (i.e. receive beamformer 16, detector 18, scan converter 20 and display 24). In other embodiments, the compound processor 22 is part of the image generation pipeline.

The compound processor 22 is configured by hardware and/or software. The compound processor 22 is configured to detect whether variance between component frames at one or more locations is due to motion or signal. Other sources may be distinguished instead or in addition. The motion may be detected by the magnitude of the variance, the pattern of the variance, or the consistency of the variance. In other embodiments, motion is detected with a sensor or analysis of the data for characteristics other than variance. Alternatively, the variance is analyzed for signal variance and other variance is assumed to be from motion.

The compound processor 22 is configured to determine a contribution of the different component frames based on the source of the variance. The contribution is set by weights used for combination or by adjusting a result of the combination. The weights are the same for all locations or may vary between locations.

The component frames are weighted differently or the same based on the source. The weighting may use different criteria depending on the source. For motion, the contribution of the steered frames of data is set as a function of a frame rate and a threshold. The threshold is a preset criterion, such as a period associated with the user's ability to perceive change (e.g., 30 ms). Using the frame rate, component frames within the period are more heavily weighted than component frames not within the period. The beginning or ending of the period is set as desired, such as based on a normally steered or on a last acquired frame. Other criteria may be used.

For speckle or other signal type sources of variance (e.g., shadow, grating lobes, aberrations), the contribution is based on the type of object at the location. The type of object may be determined by boundary detection, tissue characteristic (e.g., speckle variation) and/or other approach. The weighting is different for different types of objects.

The compound processor 22 is configured to generate a compound image from the steered frames of data as a function of the contribution. The compound processor 22 is operable to combine or compound one or more component frames of data representing at least a same region for display. For example, the compound processor 22 comprises a memory and multiplier for each of the component frames and an adder connected to each of the multipliers for combining signals representing a given spatial location from each of the component frames of data in a finite impulse response filter format. Linear or non-linear combinations of component frames of data may be provided.

The compound processor 22 is operable to combine detected and scan converted data. In alternative embodiments, the compound processor 22 is positioned between the detector 18 and scan converter 20 for combining detected but not scan converted data, positioned prior to a log compressor of the detector 18 for combining non-compressed information or positioned prior to the detector 18. Any of various embodiments for combining multiple data representing the same region or combining component frames of data may be used.

In one embodiment, the compound processor 22 includes an image display plane or memory for each of the component frames, such as six display planes. Each display plane has foreground and background pages for allowing simultaneous writing to memory while reading out from memory, but other memory structures may be provided. The memory stores information for each spatial location, such as flow mode or Doppler mode parameter data, B-mode data, a color pan box information and the display region border information. A filter responsive to different multiplier coefficients combines the component frames using different functions based on the contribution. A lookup table provides the different weighting coefficients to the multipliers. Different coefficients may also be provided for combining different numbers of component frames.

The instructions for implementing the processes, methods and/or techniques discussed above are provided on non-transitory computer-readable storage media or memories, such as a cache, buffer, RAM, removable media, hard drive or other computer readable storage media. Computer readable storage media include various types of volatile and nonvolatile storage media. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the instructions are stored in a remote location for transfer through a computer network or over telephone lines. In yet other embodiments, the instructions are stored within a given computer, CPU, GPU or system.

The display 24 is a CRT, monitor, flat screen, LCD, projection or other display for displaying the compounded ultrasound image. During the display refresh, the component frames are read, weighted, summed and thresholded to generate the image on the display 24 where display plane memories are used for each component frame of data. The resulting frame of data is a compound image responsive to component frames of data. Different locations have values from different component frames or from multiple or all of the component frames. The display image format or display region is trapezoidal, trapezoidal like, rectangular, sector, pie shaped or other shape. The compound image is updated in real-time, such as updating the compound image as each new component frame of data is acquired and a previous component frame of data is removed from a previous compound image or is removed from a buffer for compounding the next compound image. Alternatively, real-time compounding is provided by compounding different sets of component frames of data with no or few component frames used in common for each set. In yet other alternative embodiments, offline or non-real time compounding is provided.

The display 24 is operable to display a compound image responsive the steered component frames of data. The compound image reduces speckle while maintaining signal-to-noise ratio even when there is variance between the component frames of data as compared to compounding without accounting for the variance. The combined frame of data is displayed as the compound image.

In another alternative embodiment, the transducer 14 is moved during acquisition of the component frames of data. The compounded image represents an extended field of view. As different views are compounded together, the different directions of the ultrasound beams provide steered compounding. U.S. Pat. Nos. 5,566,674, 5,575,286, 5,782,766 and 6,014,473 describe various techniques for extended field of view imaging and are incorporated herein by reference. For either embodiments with a substantially stationary transducer 14 or extended field of view embodiments, the source of variance in data representing the same or similar locations in different component frames of data may be detected. The component frames of data are then weighted based on the source and any other criteria.

Other alternative embodiments include use for compounding three or four-dimensional images. Component frames of data are acquired with different lateral as well as elevation steering angles. Accounting for variation is appropriate in three or four-dimensional imaging.

While the invention has been described above by reference to various embodiments, it should be understood that many changes and modifications can be made without departing from the scope of the invention. While the description herein provides examples of steered spatial compounding, other compounding, such as temporal or frequency compounding, may alternatively or additionally be used. It is therefore intended that the foregoing detailed description be regarded as illustrative rather than limiting, and that it be understood that it is the following claims, including all equivalents, that are intended to define the spirit and scope of this invention.

We claim:

1. A method for dynamic steered spatial compounding in ultrasound imaging, the method comprising:
    acquiring steered component frames of data, the steered component frames of data representing an overlap region of a patient and being responsive to different imaging angles;
    determining when variance between the steered component frames of data is associated with motion and when the variance is associated with signal;
    setting weights as a function of the motion when the variance between the steered component frames of data is associated with the motion;
    setting the weights as a function of type of tissue when the variance is associated with signal;
    compounding the steered component frames of data together as a function of the weights; and
    generating an image of the overlap region from a result of the compounding.

2. The method of claim 1 wherein acquiring comprises scanning along scan lines where a majority of the scan lines for each steered component frame of data are at a same angle to the transducer and the angle is different for the different steered component frames of data.

3. The method of claim 1 wherein determining comprises determining either that the variance is associated with motion or that the variance is associated with signal.

4. The method of claim 1 wherein determining comprises calculating a speckle variation, setting a threshold based on the speckle variation, and determining the variance as associated with the motion where the variance is greater than the threshold and as associated with the signal where the variance is less than the threshold.

5. The method of claim 1 wherein determining comprises calculating variance at a plurality of locations in the overlap region and determining the variance as associated with the motion where the variance is similar in a threshold number of the locations and otherwise determining the variance as associated with the signal.

6. The method of claim 1 wherein determining comprises selecting a maximum value from the frames of data for a location, selecting a minimum value from the frames of data for the location, calculating a difference between the minimum and maximum values, comparing the difference to a standard deviation, determining the variance as associated with the motion where the difference greater than a threshold based on the standard deviation and otherwise determining the variance as associated with the signal.

7. The method of claim 1 wherein determining comprises determining a type of tissue for a location based on a neighborhood of surrounding locations, setting a threshold based on the type of tissue, and determining the variance as associated with the motion where the variance is above a threshold and otherwise determining the variance as associated with the signal.

8. The method of claim 1 wherein setting the weights as a function of the motion comprises setting the weights for the steered component frames within a period higher than the weights for the steered component frames acquired outside of the period.

9. The method of claim 1 wherein setting the weights as a function of the type of tissue comprises selecting a mathematical variance, standard deviation, outlier detection, skewness, kurtosis, non-parametical statistical distribution, maximum, mean, or minimum value for each location of the overlap region from the steered component frames of data as a function of the type of tissue.

10. The method of claim 9 wherein selecting comprises selecting the maximum value for soft tissue and interfacing tissue locations.

11. The method of claim 9 wherein selecting comprises selecting as a function of a user input preference.

12. The method of claim 1 wherein compounding comprises weighting values for each location of the overlap region from the steered component frames and averaging the weighted values for each of the locations.

13. The method of claim 1 further comprising averaging the steered component frames of data for each of a plurality of locations, adjusting the average for each location as a function of structure identified at the respective location, and adjusting the average as a function of the weights.

14. A non-transitory computer readable storage medium having stored therein data representing instructions executable by a programmed processor for dynamic steered spatial compounding in ultrasound imaging, the storage medium having instructions for:
estimating, from scan data, a type of object for each of a plurality of locations, multiple different types of objects being within a scan region comprising the plurality of locations;
determining, for each location, contribution of views of the locations for different directions as a function of the type of objects at the locations;
combining, for each location, the views as a function of the contribution for the location; and
generating an image from the combined views.

15. The non-transitory computer readable storage medium of claim 14 wherein estimating comprises calculating a standard deviation from the locations surrounding each location and assigning, for each location, the type of objects as a function of the standard deviation for the location.

16. The non-transitory computer readable storage medium of claim 14 wherein determining the contribution comprises selecting a maximum value for a location from the views for soft tissue and interfacing tissue and a minimum value for the location from the views for flow.

17. The non-transitory computer readable storage medium of claim 14 wherein combining comprises adjusting an average of the views as a function of the contribution.

18. A system for dynamic steered spatial compounding in ultrasound imaging, the system comprising:
a beamformer operable to acquire a sequence of steered frames of data responsive to different steering angles from a substantially same transducer position;
a processor configured to set a relative contribution of the steered frames of data as a function of a frame rate as compared to a threshold period of time, and generate a compound image from the steered frames of data as a function of the relative contribution; and
a display operable to display the compound image.

19. The system of claim 18 wherein the processor is configured to set the relative contribution to be greater for the steered frames of data within the threshold period of time and lesser for the steered frames of data outside the threshold period.

20. A non-transitory computer readable storage medium having stored therein data representing instructions executable by a programmed processor for dynamic steered spatial compounding in ultrasound imaging, the storage medium having instructions for:
acquiring electrically steered component frames of data, the steered component frames of data representing an overlap region of a patient and being responsive to different steering angles;
averaging the steered component frames of data for each location in the overlap region;
adjusting an average resulting from the averaging, the adjusting being a function of variation due to motion or signal variance between the steered component frames of data;
combining the adjusted average with a value from a marker frame; and
generating an image of the overlap region from a result of the combining.

21. The non-transitory computer readable storage medium of claim 20 further comprising adjusting, for at least another one of the locations, the average as a function of a tissue structure of the other one of the locations.

* * * * *